United States Patent
Murrietta, Sr.

[11] Patent Number: 6,074,316
[45] Date of Patent: Jun. 13, 2000

[54] SPLIT SPROCKET DEVICE

[76] Inventor: Cecil R. Murrietta, Sr., 1401 Garland, Tusin, Calif. 92780

[21] Appl. No.: 09/084,808

[22] Filed: May 26, 1998

[51] Int. Cl.[7] .................................................. F16H 55/12
[52] U.S. Cl. ................................ 474/96; 474/95; 74/450
[58] Field of Search ............................. 474/96, 95, 152, 474/161, 158; 74/89.21, 89.22, 450

[56]         References Cited

U.S. PATENT DOCUMENTS

| | | | |
|---|---|---|---|
| 403,857 | 5/1889 | Reeves et al. . | |
| 482,864 | 9/1892 | Conradson . | |
| 1,217,371 | 2/1917 | Vestine . | |
| 1,359,842 | 11/1920 | Sandberg . | |
| 1,391,719 | 9/1921 | Conyngham . | |
| 1,431,374 | 10/1922 | Cullman | 474/96 |
| 2,451,690 | 10/1948 | Oehler . | |
| 3,106,101 | 10/1963 | Harriman . | |
| 3,519,047 | 7/1970 | Dable | 474/96 X |
| 4,043,214 | 8/1977 | Westlake | 74/450 X |
| 4,711,635 | 12/1987 | Arnce | 474/152 |
| 4,964,842 | 10/1990 | Howard . | |
| 5,037,356 | 8/1991 | Gladczak et al. . | |
| 5,158,505 | 10/1992 | Woyach | 474/95 |
| 5,279,526 | 1/1994 | Gundlach . | |
| 5,322,478 | 6/1994 | Bos et al. . | |
| 5,389,044 | 2/1995 | Bandy, Jr. et al. . | |

*Primary Examiner*—David A. Bucci
*Assistant Examiner*—Marcus Charles
*Attorney, Agent, or Firm*—Gene Scott-Patent Law & Venture Group

[57]         ABSTRACT

A split sprocket is formed in two opposing half sprocket parts of essentially identical conformation and structure. The halves, when married, form a typical sprocket which may also be a gear or drive pulley. A ring is adapted to engage a circular groove on each side of the sprocket so as to assure the two halves cannot part. A pair of screws also engages the two halves so as to firmly join them. One of the rings may have a cylindrical extension which when fitted into the sprocket adapts the sprocket for being mounted onto a smaller shaft. Each half of the sprocket may be fitted with a tongue and a tongue groove for aligning and maintaining alignment of the two halves.

5 Claims, 4 Drawing Sheets

SPLIT SPROCKET DEVICE

BACKGROUND OF THE INVENTION

1. Field of the Invention

This invention relates generally to a split sprocket, and more particularly to such a split sprocket having a pair of lateral disks for engaging the halves of the sprocket in a manner for enabling the sprocket to withstand high forces and stresses.

2. Description of Related Art

The following art defines the present state of this field:

Bandy, Jr. et al., U.S. Pat. No. 5,389,044 describes a split sprocket and retainer assembly are provided for mounting on the drive shaft of a chain drive system, such as a conveyor drive system. The sprocket is split diametrically into two sections and includes a hub. Cross fixing bolts across the hub secure the two sprocket sections together on the drive shaft. A one-piece retaining ring is positioned over the sprocket hub in snug engagement, and overlying the bolts. The retaining ring absorbs the thrust force generated by the driving torque tending to radially separate the sprocket sections during operation of the drive system. A split outer retainer collar is mounted so as to about the retaining ring and to secure it in position against axial shifting and backing off the hub.

Gundlach, U.S. Pat. No. 5,279,526 describes sprocket wheels for modular plastic link belts are made in two mating halves for expediting removal perpendicularly away from a coaxial drive shaft about which they are supported without disassembly of the shaft. To assure axial alignment and stability of the mating parts overlap joints between the parts are formed by securing together in surface contact laminar flange extensions from respective sprocket wheel halves joined in driving relationship about an inner shaft to form a completed sprocket wheel assembly. For critical use in food and chemical environments, the entire sprocket assembly is made of plastic, including binding clamps for holding the two mated flange surfaces of different halves together.

Bos et al., U.S. Pat. No. 5,322,478 describes sprocket wheels for use in chain conveyors, for instance, are preferably of a divisible construction so as to enable each wheel to be removed from the shaft separately. Also, on the basis of considerations of hygiene, the outer side surface of such a wheel is preferably entirely flat when used in the food or beverage industry. Existing divisible wheels are either flat on the outside, but expensive, or not flat and cheap because they are made by injection molding. The synthetic sprocket wheel according to the invention is flat and cheap and comprises two wheel halves with axial planes abutting against each other, each wheel half consisting of two interconnected parts, made by injection molding, abutting against each other through a radial side face, with the cavities and ribs necessarily present for the injection molding process being located in the interior of the wheel half.

Gladczak et al., U.S. Pat. No. 5,037,356 describes a split power transmission element, such as a sprocket, mountable on a driven shaft. A pair of substantially identical sprocket halves each include a pair of aligned, hollow, fastener sleeves extending diagonally through the plane of the sprocket. A pair of fasteners within the sleeves join the sprocket halves to each other and clamp the sprocket onto the shaft. The diagonal orientation of the fastener sleeves permits convenient disassembly of the sprocket from an upwardly located, axially displaced position. The sprocket halves are substantially identical and can be economically molded using a single mold. A keyway insert distributes driving forces throughout the sprocket hub and increases the maximum torque capacity of the sprocket.

Howard, U.S. Pat. No. 4,964,842 describes a two piece power transmission component manufactured in segments, each segment having a central opening for assembly around a shaft, a pair of fastener flange and mating locking ridge to facilitate assembly and mating holes formed axially with the central opening for convenient operation of a fastener such as a bolt and a mating nut, each socket and fastener flange has multiple, engaging thrust surfaces to enable the assembly to withstand large forces and the bolt head and nut, when assembled, are in recessed portions of the segments such that they do not extend past the outer surfaces of the assembled segments.

E. Harriman, U.S. Pat. No. 3,106,101 provides the invention has reference to drive and driven mechanisms and is concerned in particular with the portion of such a system, commonly identified as a sprocket, pulley or gear which is customarily mounted for operation upon a shaft. More particularly, the invention is concerned with a type of sprocket, pulley or gear which is separable to the extent that it can be placed upon a shaft and dismounted therefrom without is being necessary to disengage the shaft from its customary mounting. It is therefore, among the objects of the invention to provide a new and improved split sprocket having separable sections of such character that it can be applied to and removed from the midportion of a continuous shaft, and which in operating adjustments provides ample resistance to separation both in a circumferential and in a diametrical direction. Another object of the invention is to provide a new and improved split type sprocket capable of being applied to and removed from the midportion of a continuous shaft which includes interlocking elements consisting of configurations of the sprocket itself, capable of resisting both circumferential and diametrical displacement without the need for accessory attachment means. Still another object of the invention is to provide a new and improved split type sprocket capable of being applied to and removed from the midportion of an endless shaft mounting which is so constructed that by virtue of the configuration of the sprocket itself, it is completely resistant to both circumferential and diametrical separation, and which at the same time is quick and easy to install and take off, which is applicable to virtually any size sprocket, and a shaft of virtually any relative size usable therewith and which may be adapted equally well to driving or being driven by a chain, belt or gear.

W. P. Oehler, U.S. Pat. No. 2,451,690 provides the present invention relates generally to agricultural machines and more particularly to implements of the type that are adapted to be mounted on a farm tractor or the like wherein the implement includes a part that is adapted to be driven, for example from the tractor axle shaft. The object and general nature of the present invention is the provision of a new and improved form of detachable sprocket that is adapted to be mounted on an axle shaft without removing the tractor wheel or other parts therefrom. More specifically, it is a feature of this invention to provide a new and simplified detachable sprocket section which, in general, comprises only two parts adapted to be assembled about the axle shaft or other support and to be interlocked one with the other with a simple clamping means, preferably acting directly against the shaft, for rigidly and positively holding the sprocket pairs assembled about the shaft or other support upon which they are mounted. A further feature of this invention is a provision of a detachable sprocket which provides integral interlocking sockets and lugs with which cooperating set screw means serve not only to hold the sprocket parts together but also to clamp them to the axle shaft or other support, thereby eliminating all attaching and connecting bolts, lock washers and the like which heretofore have been considered necessary.

W. B. Conynham, U.S. Pat. No. 1,391,719 provides new and useful improvements in sectional gear wheels. An importan object of this invention is the provision of a sectional gear wheel, embodying means which will effectively lock the sections together to prevent pulling apart thereof, as well as to prevent translational movement with respect to each other. A further object of the invention is the provision of a sectional gear wheel for the purpose of facilitating assembling on a shaft without taking down the shaft, or the performance of any other work incidental thereto, excepting that which pertains merely to the locking of the two sections upon the shaft. A further object of the invention is the provision of a sectional gear wheel comprising a plurality of sections, which are in effect companion members, and having embodied therewith a means for locking said members together, which means can also be used as a means for keying the assembled gear wheel to a shaft.

The prior art teaches the splitting of sprockets and gears and such for easy removal and replacement on a shaft that is inaccessible. However, the prior art does not teach that such a device may be reinforced by laterally mounted face plates, and that such plates may include a central adapter cylinder for mounting the sprocket onto a smaller shaft and for easier removal of a damaged sprocket half. The present invention fulfills these needs and provides further related advantages as described in the following summary.

SUMMARY OF THE INVENTION

The present invention teaches certain benefits in construction and use which give rise to the objectives described below.

The present invention provides a split sprocket formed in two opposing half sprocket parts of essentially identical conformation and structure. The halves, when married, form a typical circular sprocket but may alternately be a gear or drive pulley. A ring is adapted to engage a circular groove on each side of the sprocket so as to assure the two halves cannot part. A pair of screws also engages the two halves so as to firmly join them. One of the rings may have a cylindrical extension which when fitted into the sprocket adapts the sprocket for being mounted onto a smaller shaft. Each half of the sprocket may be fitted with a tongue and a tongue groove for aligning and maintaining alignment of the two halves.

A primary objective of the present invention is to provide a split sprocket assembly having advantages not taught by the prior art.

Another objective is to provide such an assembly with added means for securing the sprocket halves together for greater stability under extreme forces.

A further objective is to provide such an assembly with means for mounting the assembly on a variety of shaft sizes.

A still further objective is to provide such an assembly with means for improved alignment of the sprocket halves.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
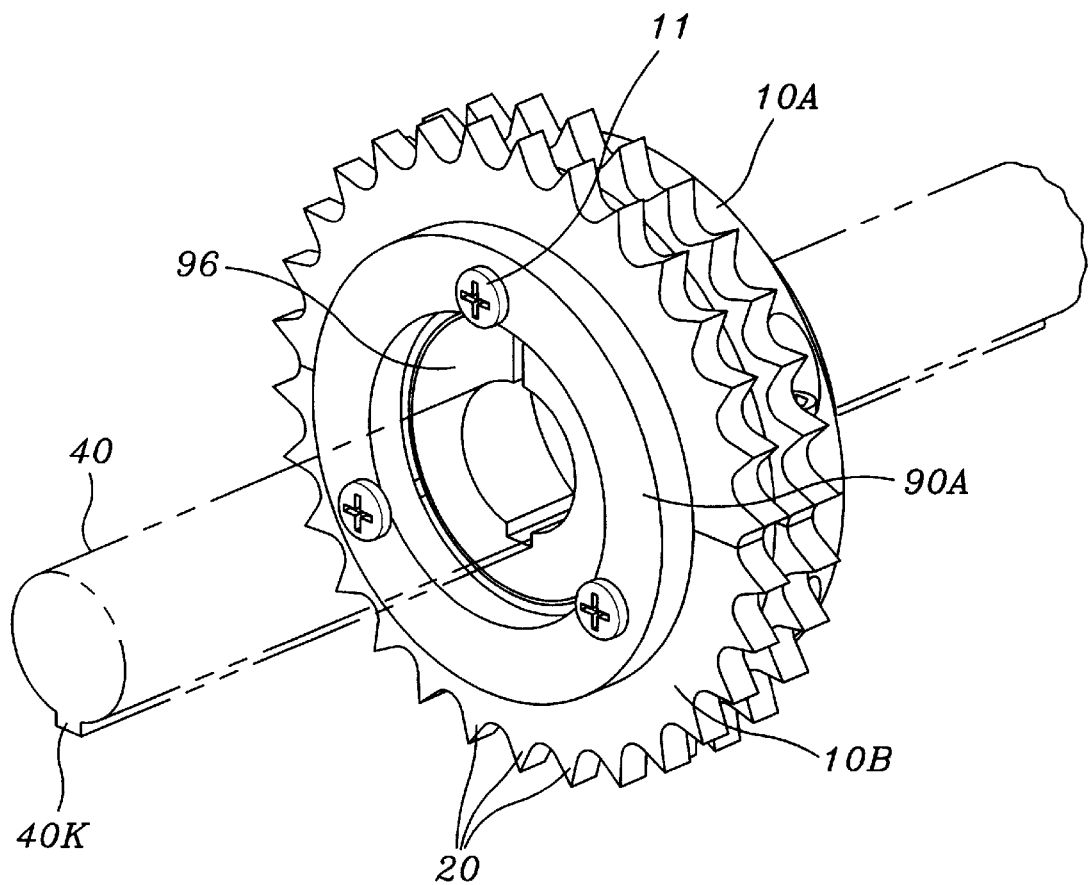
FIG. 1 is a perspective view of a first embodiment of the present invention as assembled.
Figure 2:
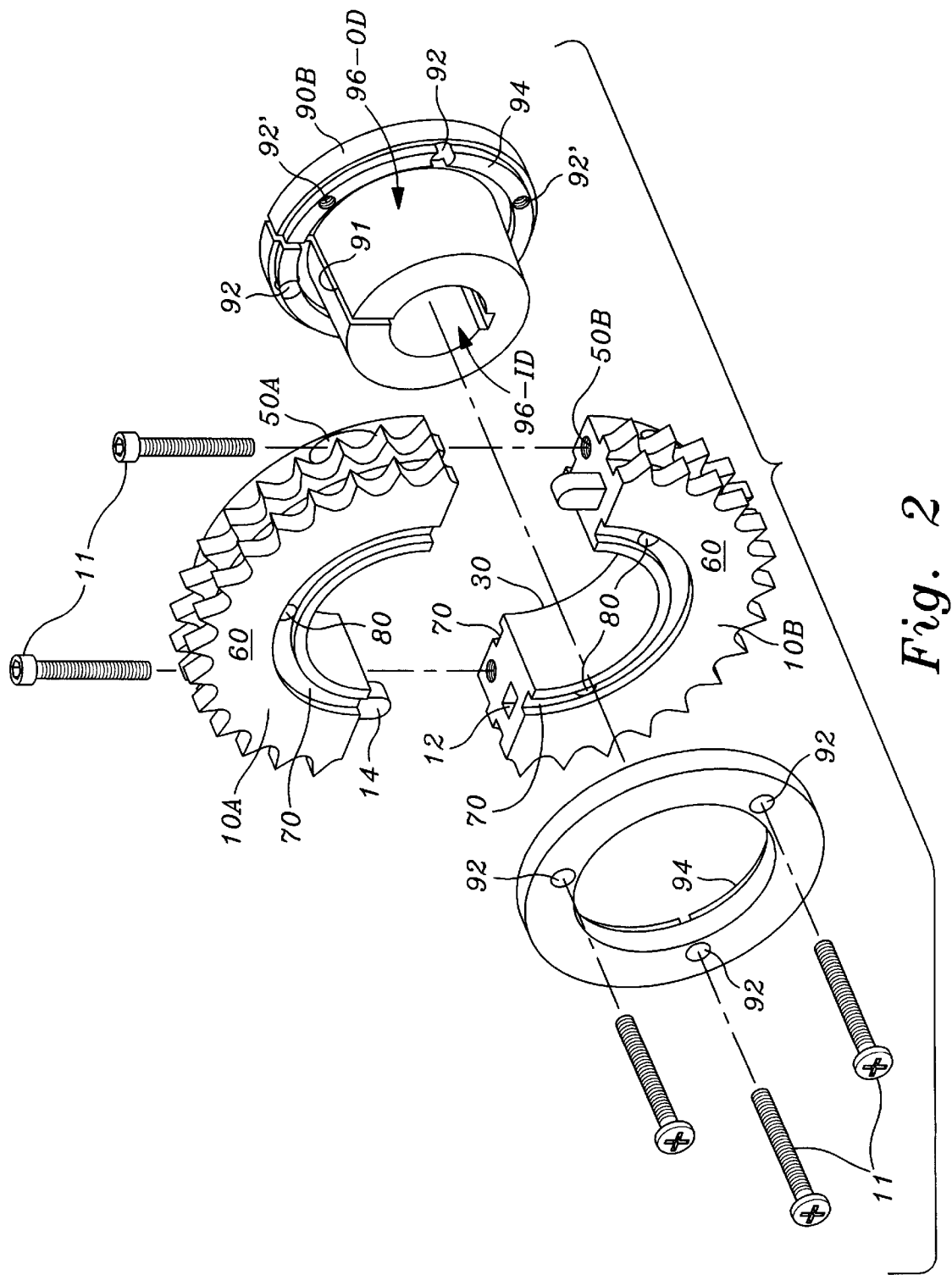
FIG. 2 is an exploded perspective view thereof showing a first ring with clearance holes therein, a sprocket with clearance holes therein, and a second ring with tapped holes for receiving a fastening means, the second ring providing an adapter collar.
Figure 3:
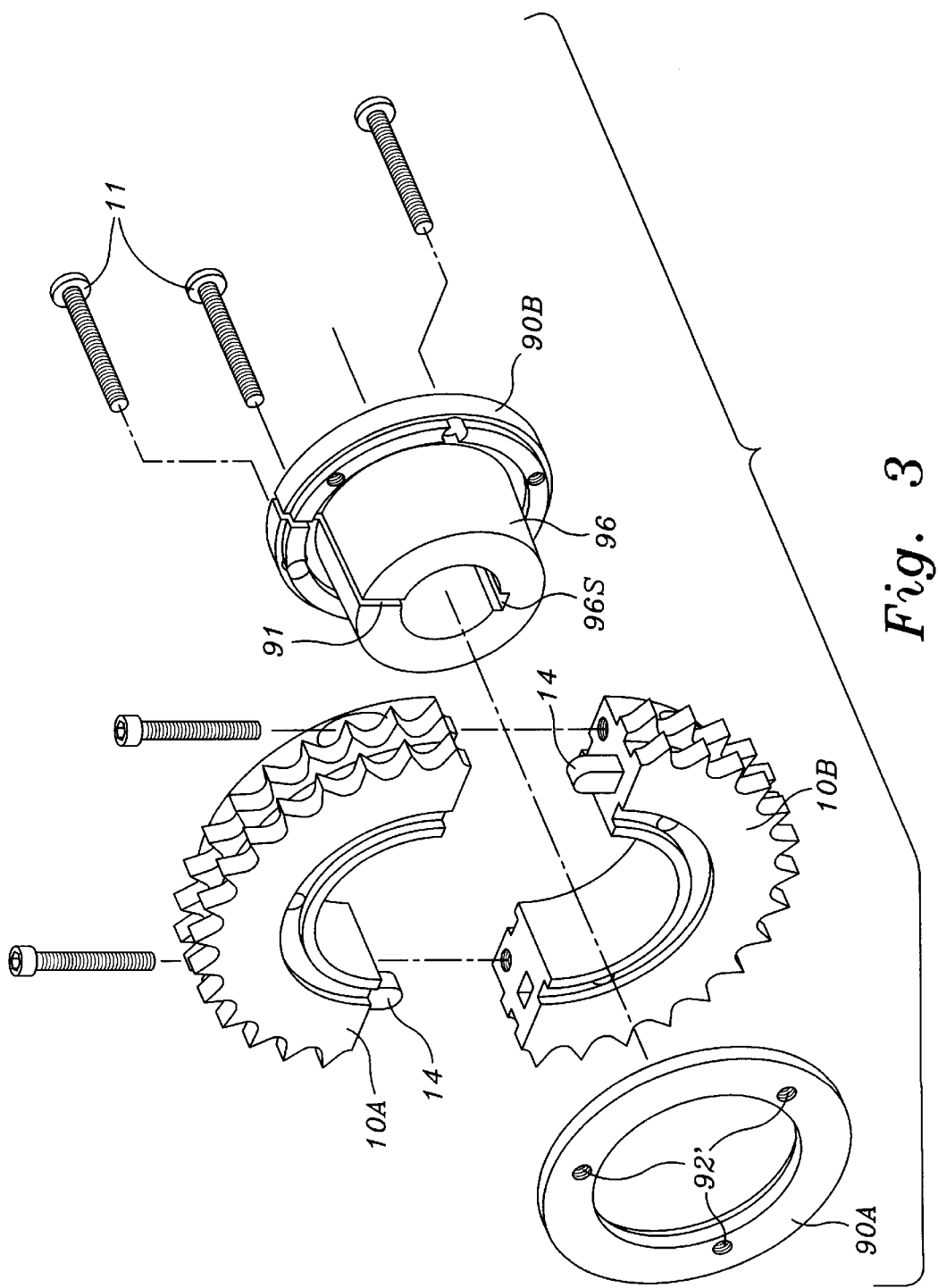
FIG. 3 is an exploded perspective view similar to that of FIG. 2, but showing the first ring with tapped holes therein, and the second ring with clearance holes for receiving the fastening means.
Figure 4:
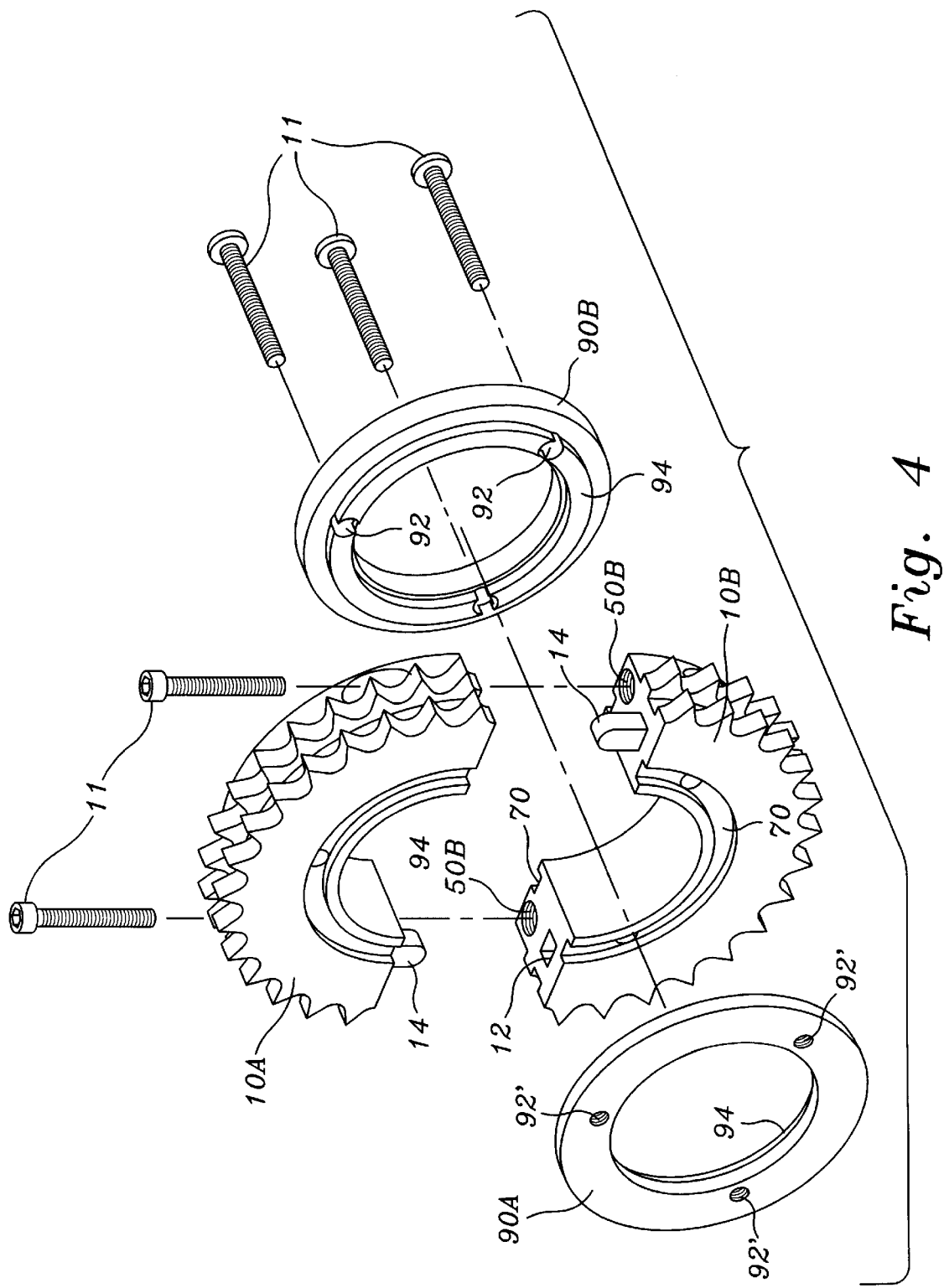
FIG. 4 is an exploded perspective view similar to that of FIG. 3, but without the adapter collar.

The above described drawing figures illustrate the invention, a split sprocket assembly. However, the illustration and description is equally applicable to a circular gear or a pulley as would be clear to one of skill in the art. The assembly comprises: a pair of sprocket halves 10A and 10B, as shown in FIGS. 2–4 which may be married to form a complete circular part for mounting onto a mounting and drive shaft 40 as best seen in FIG. 1. Together the sprocket provides a peripheral, annular, drive gripping means 20 therearound which may be the sprocket teeth shown in the figures, or may be gear teeth, or may be a belt groove, etc. A circular mounting aperture 30 is axially centered therein and is adapted for receiving the mounting and drive shaft 40, such adaptation being a proper tight fit to the shaft 40. A means for joining 50A and 50B of the sprocket halves 10A and 10B preferably includes a clearance hole 50A and a machine threaded hole 50B. A pair of opposing sprocket side faces 60 and a pair of corresponding, circular slots 70 make up the sprocket lateral conformation, one of the circular slots 70 being axially centered on each one of the sprocket side faces 60, the sprocket halves 10A, 10B further providing a plurality of axially oriented clearance holes 80 positioned within the circular slots 70 and joining the slots 70. The assembly further includes a pair of separable, circular rings 90A and 90B, each of the circular rings 90 providing a plurality of mounting holes 92 aligned with the clearance holes 80 of the sprocket halves 10A, 10B, the circular rings each further providing a circular shoulder 94 corresponding with one of the circular slots 70 and circularly engagable therewith. Fastening means 11 is used for engaging the mounting holes 92 of the circular rings 90A,B and the clearance holes 80 of the sprocket halves 10A,B, for securing the circular rings 90A,B to the sprocket halves 10A,B, and for engaging the joining means 50A,B of the sprocket halves 10A,B for securement thereof.

Preferably, the mounting holes 92 of one of the circular rings 90B each provides a machine thread 92', the mounting holes of the other of the circular rings 90A each provides a bolt clearance, and the fastening means 11 is a plurality of machine bolts, however, the rings 90A,B each may be adapted, as shown in FIGS. 2 and 3 (ring 90B) to have both clearance as well as tapped holes so as to be used as shown in FIG. 2 or FIG. 3.

Preferably, the one of the circular rings 90B further provides a central cylindrical portion 96 extending therefrom, the cylindrical portion 96 providing an outside diameter 96-OD for tight-fitting within the mounting aperture 30 of the pair of sprocket halves 10A,B, and an inside diameter 96-ID adapted to receive the mounting shaft 40.

Preferably, the cylindrical portion provides a key slot 96S engagable with a key 40K of the mounting shaft 40.

Preferably, the one of the circular rings 90B defines a radial slit 91 for providing radial expansion of the ring when it is pressed onto shaft 40.

Preferably, each of the sprocket halves 10A,B provides an alignment hole 12, such as the square hole shown as reference numeral 12 in FIGS. 2 and 4, and an alignment tongue 14, shown as reference numeral 14, the alignment holes 12 and tongues 14 being positioned in engagable correspondence so that one of each of the tongues 14 is fully engaged within one of each of the holes 12 when the sprocket halves 10A and 10B are married as shown in FIG. 1. Preferably, the tip of the tongue 14 is rounded as shown so as to improve the ease with which the tongue 14 may be inserted into the alignment hole 12.

In use the instant invention, when damaged, is able to be removed from the drive shaft 40 without disassembly of the shaft or other parts of the machine. Disassembly of the invention requires merely removal of the fasteners 11, whereupon the invention may be split apart and taken off the shaft 40.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A split sprocket assembly comprising:

a pair of sprocket halves, together providing a peripheral, annular, drive gripping means therearound, a circular mounting aperture axially centered therein adapted for receiving a mounting shaft, a means for joining the sprocket halves, said joining means comprising in each of the sprocket halves a mutually directed alignment hole and an alignment tongue, each of rectangular cross-section, so as to be positioned in engagable correspondence so that one of each of the tongues is fully engaged within one of each of the holes when the sprocket halves are joined and at least one clearance hole in one of the sprocket halves aligned with at least one threaded hole in the other of the sprocket halves for receiving at least one threaded fastener for drawing the two sprocket halves together, a pair of opposing sprocket side faces and a pair of co-aligned, circular slots, one of the circular slots being axially centered on each one of the sprocket side faces, the sprocket halves further providing a plurality of axially oriented clearance holes positioned within the circular slots;

a pair of circular rings, each of the circular rings providing a plurality of mounting holes aligned with the clearance holes of the sprocket halves, the circular rings each further providing a circular shoulder corresponding with one of the circular slots and engagable therewith;

a fastening means for engaging the mounting holes of the circular rings and the clearance holes of the sprocket halves, for securing the circular rings to the sprocket halves, and for engaging the joining means of the sprocket halves for securement thereof.

2. The assembly of claim 1 wherein the mounting holes of one of the circular rings each provides a machine thread, the mounting holes of the other of the circular rings each provides a bolt clearance, and the fastening means is a plurality of machine bolts.

3. The assembly of claim 1 wherein one of the circular rings further provides a central cylindrical portion extending therefrom, the cylindrical portion providing an outside diameter for tight-fitting within the mounting aperture of the pair of sprocket halves, and an inside diameter adapted to receive a mounting shaft.

4. The assembly of claim 3 wherein the cylindrical portion provides a key slot engagable with a key of the mounting shaft.

5. The assembly of claim 4 wherein the one of the circular rings defines a radial slit for providing radial expansion of the ring.

\* \* \* \* \*